United States Patent
Fu

(10) Patent No.: US 10,802,332 B2
(45) Date of Patent: Oct. 13, 2020

(54) LOW COST BACKLIGHT MODULE AND DISPLAY DEVICE

(71) Applicant: HUIZHOU CHINA STAR OPTOELECTRONICS TECHNOLOGY CO., LTD., Huizhou Guangdong (CN)

(72) Inventor: Linlin Fu, Huizhou Guangdong (CN)

(73) Assignee: HUIZHOU CHINA STAR OPTOELECTRONICS TECHNOLOGY CO., LTD., Huizhou (CN)

(*) Notice: Subject to any disclaimer, the term of this patent is extended or adjusted under 35 U.S.C. 154(b) by 359 days.

(21) Appl. No.: 15/975,643

(22) Filed: May 9, 2018

(65) Prior Publication Data
US 2019/0196268 A1    Jun. 27, 2019

Related U.S. Application Data

(63) Continuation of application No. PCT/CN2018/073987, filed on Jan. 24, 2018.

(30) Foreign Application Priority Data

Dec. 26, 2017 (CN) .......................... 2017 1 1435415

(51) Int. Cl.
*G02F 1/13357* (2006.01)
*G02B 5/02* (2006.01)
(Continued)

(52) U.S. Cl.
CPC ..... *G02F 1/133603* (2013.01); *G02B 5/0284* (2013.01); *G02B 6/00* (2013.01);
(Continued)

(58) Field of Classification Search
CPC ......... G02F 1/133603; G02F 1/133606; G02F 1/133605; G02F 1/133611;
(Continued)

(56) References Cited

U.S. PATENT DOCUMENTS

| 8,622,565 B2* | 1/2014 | Kawada | G02F 1/133605 362/97.2 |
| 8,876,316 B2* | 11/2014 | Lu | G09F 13/04 362/97.1 |

(Continued)

FOREIGN PATENT DOCUMENTS

| CN | 101211054 A | 7/2008 |
| CN | 201706328 U | 1/2011 |

(Continued)

*Primary Examiner* — Peggy A Neils
(74) *Attorney, Agent, or Firm* — Hemisphere Law, PLLC; Zhigang Ma

(57) ABSTRACT

This invention discloses a low-cost backlight module including a plurality of light source assemblies arranged in an array, and a reflector as well as a diffuser plate both disposed beside each light source assembly, wherein the reflector includes a circle of side reflection wall arranged annularly around the light source assembly, each of the light source assemblies includes a plurality of spot light sources spaced apart circumferentially and faced toward the side reflection wall, and the light emitted by the spot light source toward the side reflection wall is reflected by the side reflection wall and then emitted out from the diffuser plate. This invention further discloses a display device. An area of the diffuser plate that is emitted by each spot light source is enlarged and the emitted light becomes more uniform. The number of spot light sources is reduced and the problem of LED Mura is avoided.

7 Claims, 1 Drawing Sheet

(51) Int. Cl.
*G02B 27/09* (2006.01)
*G02B 19/00* (2006.01)
*G02B 6/00* (2006.01)

(52) U.S. Cl.
CPC ..... *G02B 19/0019* (2013.01); *G02B 19/0066* (2013.01); *G02B 27/0977* (2013.01); *G02B 5/0278* (2013.01); *G09G 2320/0233* (2013.01)

(58) Field of Classification Search
CPC ........ G02F 2001/133607; G02F 2001/133613; G02B 19/0019; G02B 6/00; G02B 19/0066; G02B 5/0284; G02B 27/0977; G02B 5/0278; G09G 2320/0233
See application file for complete search history.

(56) References Cited

U.S. PATENT DOCUMENTS 9,696,584 B2 * 7/2017 Nameda ................ G02B 6/0055
9,829,180 B2 * 11/2017 Lee .......................... F21V 5/005

FOREIGN PATENT DOCUMENTS

| CN | 102112801 A | 6/2011 |
|----|-------------|--------|
| CN | 201973601 U | 9/2011 |
| CN | 103047578 A | 4/2013 |
| CN | 203286495 U | 11/2013 |
| CN | 103712127 A | 4/2014 |
| CN | 105204107 A | 12/2015 |
| JP | 2007-157354 A | 6/2007 |
| WO | 2013/088594 A1 | 6/2013 |

* cited by examiner

LOW COST BACKLIGHT MODULE AND DISPLAY DEVICE

RELATED APPLICATIONS

This application is a continuation application of POT Patent Application No. PCT/CN2018/073987, filed Jan. 24, 2018, which claims the priority benefit of Chinese Patent Application No. 201711435415.1, filed Dec. 26, 2017, which is herein incorporated by reference in its entirety.

FIELD OF THE DISCLOSURE

The disclosure relates to a field of display technology, and more particularly to a low cost backlight module and display device.

BACKGROUND

As one of the mainstream flat panel display products, LCD (Liquid Crystal Display) has become mature both in a direct type backlight and an edge type backlight designs.

Currently, in terms of LCDs having a lower specification, a main goal of each manufacturer is to reduce TV cost so as to maximize profit. Most of direct type backlight designs use LEDs (Light Emitting Diode) and a secondary lens to reduce the number of LEDs so as to achieve a purpose of reducing cost. However, a divergence angle of the secondary lens is limited, so a LED Mura (shadow) problem arises along with an increase of an LED pitch, resulting in a very limited reduction in number of LEDs finally. Therefore, the above method is not significant for reducing cost. Therefore, there is a need to provide a more excellent backlighting solution to achieve more significant cost reduction.

SUMMARY

In view of the deficiencies of the prior art, the present invention provides a low-cost backlight module and a display device, which can obviously reduce the cost of the backlight module and avoid the LED Mura problem.

In order to achieve the above object, the present invention adopts the following technical solutions.

A low-cost backlight module includes a plurality of light source assemblies arranged in an array, and a reflector as well as a diffuser plate both disposed beside each light source assembly, wherein the reflector includes a circle of side reflection wall arranged annularly around the light source assembly, each of the light source assemblies includes a plurality of spot light sources spaced apart circumferentially and faced toward the side reflection wall, and the side reflection wall includes a shrinking end proximate the light source assembly and a flaring end away from the light source assembly. The diffuser plate is disposed at a distance from the light source assembly, and the light emitted by the spot light source toward the side reflection wall is reflected by the side reflection wall and then emitted out from the diffuser plate.

As one of the embodiments, the spot light source is an LED.

As one of the embodiments, the side reflection wall is formed by splicing a plurality of trapezoidal reflection sheets.

Alternatively, the inner surface of the side reflection wall is an arc surface, and the arc surface is convex toward the corresponding spot light source.

As one of the embodiments, the light source assembly includes a plurality of annularly arranged substrates, each of the substrate is provided with at least one spot light source on its surface, and all of the substrates are combined to form an annular cylinder structure.

As one of the embodiments, the reflector further includes a bottom reflection wall connected to the shrinking end of the side reflection wall, and the substrate is fixed on the bottom reflection wall.

As one of the embodiments, the substrate is disposed obliquely with respect to the diffuser plate.

As one of the embodiments, the spot light source faces both of the side reflection wall and the bottom reflection wall, and the closer to the diffuser plate, the large an annular opening surrounded by the substrate is.

As one of the embodiments, the light source assembly further includes lenses, and each of the spot light sources is encapsulated with one of the lenses on its surface.

Another object of the present invention is to provide a display device including a display panel and the low-cost backlight module, the display panel being disposed above the diffuser plate of the backlight module.

Each of the spot light sources in the present invention is surrounded by a reflector with inclined reflection surface. Multiple spot light sources are integrated inside a same reflector and share a same reflector. The light emitted by each spot light source is mostly reflected by the reflector and emitted to the diffuser plate at top for outputting. Thus, an area of the diffuser plate that is emitted by each spot light source is enlarged and the emitted light becomes more uniform. The number of spot light sources is thus reduced and the problem of LED Mura is avoided.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to understand the above objectives, features and advantages of the present disclosure more clearly, the present disclosure is described in detail below with references to the accompanying drawings and specific embodiments. It should be understood that the specific embodiments described herein are merely used to explain the present invention, and are not intended to limit the present invention.

Figure 1:
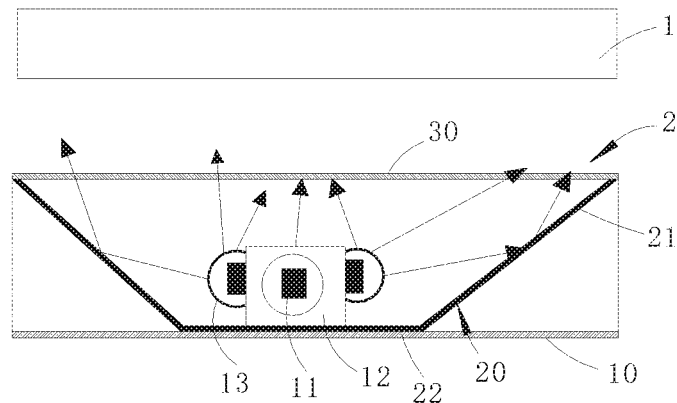
FIG. 1 is a schematic structural diagram of a display device according to an embodiment of the present invention.

Referring to FIG. 1, a display device according to an embodiment of the present invention includes a display panel 1 and a backlight module 2. The display panel 1 is disposed above a diffuser plate 30 of the backlight module 2. The backlight module 2 mainly comprises a plurality of light source assemblies 10 arranged in an array, and a reflector 20 as well as the diffuser plate 30 both disposed beside each light source assembly 10. The reflector 20 includes a circle of side reflection wall 21 annularly arranged around the light source assembly 10. The reflector 20 may also be fixed by a back plate 40. Each of the light source assemblies 10 includes a plurality of spot light sources 11 spaced apart circumferentially and faced toward the side reflection wall 21. The side reflection wall 21 includes a shrinking end near the light source assembly 10 and a flaring end away from the light source assembly 10. The diffuser plate 30 is spaced apart from the light source assembly 10. The light emitted from the spot light source 11 toward the side reflection wall 21 is reflected by the side reflection wall 21 and then emitted out from the diffuser plate 30.

Here, the spot light source 11 is described as an LED. It is understood that the spot light source 11 may also be another light source such as a quantum tube. A set of optical film (not shown) may be further disposed above the diffuser plate 30, so as to collect the light after an astigmatism processing and to pass the light to the display panel 1 located above.

Figure 2:
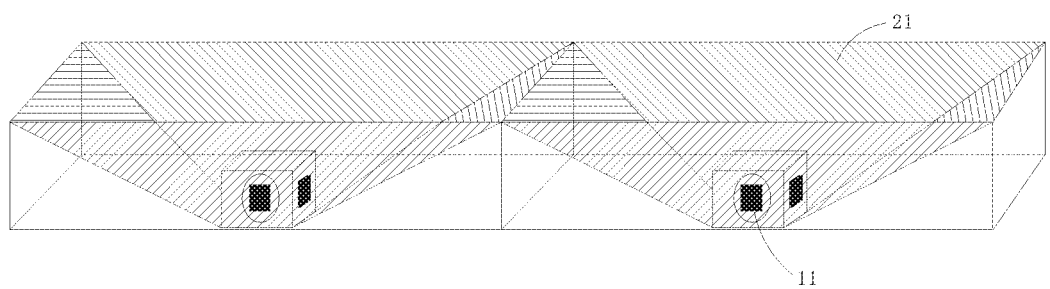
FIG. 2 is a partially structural schematic diagram of a backlight module according to an embodiment of the present invention.

As shown in FIG. 2, the side reflection wall 21 of this embodiment is formed by splicing a plurality of trapezoidal reflection sheets. The light source assembly 10 is located at the center of the side reflection wall 21. The side reflection walls 21 of two adjacent reflectors 20 are connected together or may be integrally formed, and may be supported on an inner surface of the back plate 40 by using separated fixing brackets, or by support structures such as support columns formed by a protrusions on the back plate 40. Here, four trapezoidal reflection sheets are taken as an example for description. Four trapezoidal reflection sheets are sequentially spliced to form a side reflection wall 21 with a flaring opening. The light source assembly 10 includes four annularly arranged substrates 12. Each substrate 12 is provided with at least one spot light source 11 by means of adhesion. All the substrates 12 are combined to form an annular cylinder structure, and the top of the cylinder structure can be sealed with a bridging plate to form a closed structure. In case the substrate 12 is fixed, the LED on each substrate 12 is directly opposite to a reflection sheet of the side reflection wall 21 to reflect the light emitted by the corresponding LED to the diffuser plate 30.

The reflector 20 also has a bottom reflection wall 22 connected to the shrinking end of the side reflection wall 21, i.e., the bottom end as shown in FIG. 2. The substrate 12 is fixed to the bottom reflection wall 22. The bottom reflection wall 22 is fixed to the inner surface of the back plate 40. A heat dissipating column may also be disposed in a space surrounded by the substrate 12. The heat dissipating column may serve as a heat dissipating structure of the substrate 12, and on the other hand may also serve as a fixing frame of the substrate 12.

It can be understood that the number of the trapezoidal reflection sheets and the substrate 12 of the present invention is not limited and can be freely designed according to requirements.

Since the end of the spot light source 11 faces the side reflection wall 21 and has a certain interval from the bottom reflection wall 22, a part of the light emitted from the spot light source 11 is directed to the side reflection wall 21, a part thereof is directed to the bottom reflection wall 22, and a part thereof is directly directed to the upper diffuser plate 30. That is, most of the light is emitted toward the diffuser plate 30 through once or more reflection by means of the side reflection wall 21 and the bottom reflection wall 22. Thereby, a radiation scope of the light emitted from the spot light source 11 is enlarged, and on the other hand a uniform light effect is also achieved.

Figure 3:
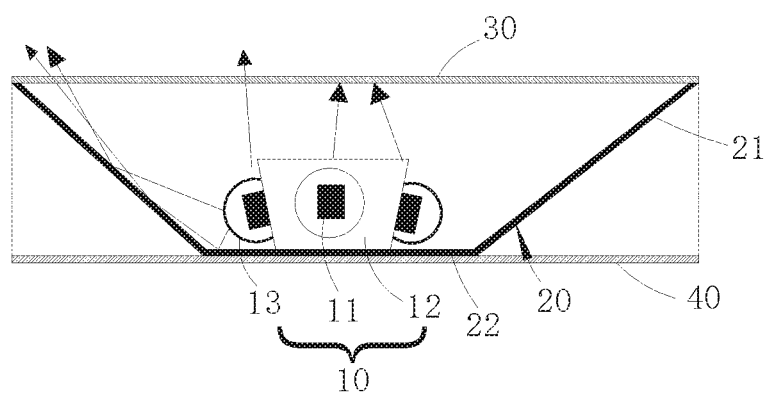
FIG. 3 is a partially structural schematic diagram of another backlight module according to an embodiment of the present invention.

Furthermore, the inner surface of the side reflection wall 21 in this embodiment may also be designed as an arc surface, and the arc surface is convex toward the corresponding spot light source 11. The light reflected by the reflection surface of the arc surface is more divergent. The light source assembly 10 may comprise a lens 13. Each spot light source 11 is encapsulated with a scattering lens 13 on its surface to further disperse the light. As shown in FIG. 3, the substrate 12 is also inclined with respect to the diffuser plate 30 in such a manner that the substrate 12 also forms a flaring opening. That is, the spot light source 11 faces both the side reflection wall 21 and the bottom reflection wall 22 such that the closer to the diffuser plate 30, the larger an annular opening enclosed by the substrate 12 is. In this way, the light emitted by the spot light source 11 can be more reflected and emitted, and the incident angle of the light entering the diffuser plate 30 is enlarged. A radiation scope of a single LED is enlarged.

Each spot light source of the present invention is surrounded by a reflector with inclined reflection surfaces. Multiple spot light sources are integrated inside a same reflector and share a same reflector. The light emitted by each spot light source is mostly reflected by the reflector and emitted to the diffuser plate at top for outputting. An area of the diffuser plate that is emitted by each spot light source is enlarged and the emitted light becomes more uniform. The number of spot light sources is thus reduced and at the same time the problem of LED Mura is avoided.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A low-cost backlight module, comprising a plurality of light source assemblies arranged in an array, and a reflector as well as a diffuser plate both disposed beside each of the light source assemblies, wherein, each of the light source assemblies includes a plurality of spot light sources spaced apart circumferentially, and, for any selected one of the light source assemblies, the reflector includes a side reflection wall arranged annularly around the selected light source assembly, the spot light sources are faced toward the side reflection wall, the side reflection wall includes a shrinking end proximate the selected light source assembly and a flaring end away from the selected light source assembly, the diffuser plate is disposed at a distance from the selected light source assembly, and the light emitted by the spot light sources toward the side reflection wall is reflected by the side reflection wall and then emitted out from the diffuser plate, wherein each of the light source assembly includes a plurality of annularly arranged substrates, each of the substrates is provided with at least one spot light source on its surface, and all of the substrates are combined to form an annular cylinder structure, wherein the reflector further includes a bottom reflection wall connected to the shrinking end of the side reflection wall, and the substrates are fixed on the bottom reflection wall, wherein the substrate is disposed obliquely with respect to the diffuser plate, wherein each of the spot light sources faces both of the side reflection wall and the bottom reflection wall, and the closer an annular opening surrounded by the substrates to the diffuser plate is, the larger the annular opening is.

2. The backlight module as claimed in claim 1, wherein each of the spot light sources is an LED.

3. The backlight module as claimed in claim 2, wherein, the side reflection wall is formed by splicing a plurality of trapezoidal reflection sheets.

4. The backlight module as claimed in claim 2, wherein the inner surface of the side reflection wall is convex toward the corresponding spot light source.

5. The backlight module as claimed in claim 1, wherein each of the light source assemblies further includes a lens and each of the spot light sources is encapsulated with the lens on its surface.

6. A display device including a display panel and a backlight module, the display panel being disposed above a diffuser plate of the backlight module, wherein the backlight module comprises a plurality of light source assemblies arranged in an array, and a reflector as well as the diffuser plate both disposed beside each of the light source assemblies, and wherein, each of the light source assemblies includes a plurality of spot light sources spaced apart circumferentially, and, for any selected one of the light source assemblies, the reflector includes a side reflection wall arranged annularly around the selected light source assembly, the spot light sources are faced toward the side reflection wall, the side reflection wall includes a shrinking end proximate the selected light source assembly and a flaring end away from the selected light source assembly, the diffuser plate is disposed at a distance from the selected light source assembly, and the light emitted by the spot light sources toward the side reflection wall is reflected by the side reflection wall and then emitted out from the diffuser plate, wherein each of the light source assembly includes a plurality of annularly arranged substrates, each of the substrates is provided with at least one spot light source on its surface, and all of the substrates are combined to form an annular cylinder structure, wherein the reflector further includes a bottom reflection wall connected to the shrinking end of the side reflection wall, and the substrates are fixed on the bottom reflection wall, wherein the substrate is disposed obliquely with respect to the diffuser plate, wherein each of the spot light sources faces both of the side reflection wall and the bottom reflection wall, and the closer an annular opening surrounded by the substrates to the diffuser plate is, the larger the annular opening is.

7. The backlight module as claimed in claim 6, wherein, the side reflection wall is formed by splicing a plurality of trapezoidal reflection sheets.

* * * * *